(12) United States Patent
Kim

(10) Patent No.: US 11,603,125 B2
(45) Date of Patent: Mar. 14, 2023

(54) APPARATUS AND METHOD FOR ESTIMATING COLUMN TORQUE IN MOTOR-DRIVEN POWER STEERING SYSTEM

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 325 days.

(21) Appl. No.: 16/891,839

(22) Filed: Jun. 3, 2020

(65) Prior Publication Data

US 2020/0391788 A1 Dec. 17, 2020

(30) Foreign Application Priority Data

Jun. 11, 2019 (KR) .................. 10-2019-0068608

(51) Int. Cl.
*B62D 5/04* (2006.01)
*B62D 6/00* (2006.01)
*G01L 5/22* (2006.01)

(52) U.S. Cl.
CPC .............. *B62D 5/0463* (2013.01); *B62D 6/00* (2013.01); *G01L 5/221* (2013.01)

(58) Field of Classification Search
CPC ........ B62D 5/0463; B62D 6/00; B62D 6/003; B62D 6/10; B62D 5/0484; B62D 6/002; G01L 5/221; G01L 5/0042; B60W 10/20; B60W 2510/202; B60W 2510/205; B60W 2520/14; B60W 2540/18; B60Y 2400/301; B60Y 2400/303; B60Y 2400/307

USPC .......................................................... 701/41
See application file for complete search history.

(56) References Cited

U.S. PATENT DOCUMENTS 6,240,350 B1 * 5/2001 Endo .................... B62D 5/0466
701/41
2019/0126978 A1 * 5/2019 Kim ...................... B62D 5/0463

FOREIGN PATENT DOCUMENTS

| KR | 10-2008-0078428 A | 8/2008 | |
| KR | 10-2015-0131783 A | 11/2015 | |
| KR | 2172089 B1 * | 10/2020 | ............ B60W 10/20 |

OTHER PUBLICATIONS

KR-2172089-B1—English Translation (Year: 2014).*

* cited by examiner

*Primary Examiner* — Scott A Reinbold
(74) *Attorney, Agent, or Firm* — DLA Piper LLP (US)

(57) ABSTRACT

An apparatus for estimating a column torque in a motor-driven power steering system includes a vehicle speed sensing unit configured to sense a vehicle speed; a steering sensing unit configured to sense a steering state of a driver; a yaw rate sensor configured to output a measured yaw rate by sensing a tilted state of a vehicle; and a column torque estimation unit configured to calculate a self-aligning torque and an estimated yaw rate based on the vehicle speed and the steering state inputted from the vehicle speed sensing unit and the steering sensing unit, estimate a column torque by adjusting angular velocity compensation gains with respect to a steering angular velocity for each of the estimated yaw rate and the vehicle speed, and output a final column torque by adjusting the estimated column torque according to a difference between the measured yaw rate and the estimated yaw rate.

8 Claims, 2 Drawing Sheets

APPARATUS AND METHOD FOR ESTIMATING COLUMN TORQUE IN MOTOR-DRIVEN POWER STEERING SYSTEM

CROSS-REFERENCE TO RELATED APPLICATION

This application claims priority from and the benefit of Korean Patent Application No. 10-2019-0068608, filed on Jun. 11, 2019, which is hereby incorporated by reference for all purposes as if set forth herein.

BACKGROUND

Field

Exemplary embodiments of the present disclosure relate to an apparatus and method for estimating a column torque in a motor-driven power steering system, and more particularly, to an apparatus and method for estimating a column torque in a motor-driven power steering system, which can estimate and provide a column torque to generate an assist torque required for a driver, even though a torque sensor breaks down in the motor-driven power steering system, thereby maximizing the safety and robustness of the motor-driven power steering system.

Discussion of the Background

In general, a motor-driven power steering (MDPS) system refers to a steering system which provides an assist torque in a driver's steering direction, using an electric motor, and thus enables the driver to easily handle a steering wheel.

Unlike an existing hydraulic power steering (HPS) system, the MDPS system may automatically control the operation of the electric motor depending on a driving condition of a vehicle, and thus, may improve the steering performance and a steering feel.

The MDPS system determines the driving condition of the vehicle by including a torque sensor which measures a steering torque of the driver, inputted to the steering wheel, a steering angle sensor which measures a steering angle of the steering wheel and a vehicle speed sensor which measures a vehicle speed.

Meanwhile, in the case where the torque sensor breaks down while the vehicle having the MDPS system mounted therein travels, since the MDPS system is likely to provide an inappropriate assist force to disturb the driver's steering, the MDPS system is switched to a manual mode.

However, as such, in the case where the MDPS system is suddenly switched to the manual mode, the driver may feel a strong sense of heterogeneity during steering.

For example, if the MDPS system is suddenly switched to the manual mode in a low-speed cornering situation, the driving safety of the vehicle may be degraded as the driver's steering feel suddenly becomes heavy, and accordingly, an accident may occur.

In such an MDPS system, in order to steer the vehicle according to the driver's steering intention, the driver's torque amount sensed by the torque sensor should be used. Therefore, in the case where the torque sensor breaks down, a problem may be caused in that it is impossible to appropriately perform steering as the MDPS system is switched to the manual mode.

A background art of the disclosure is disclosed in Korean Patent Laid-Open Publication No. 2008-0078428 (published on Aug. 27, 2008 and entitled "Torque Sensor Center Point Compensation Method for Use in Electric Power Steering Apparatus").

SUMMARY

Various embodiments are directed to an apparatus and method for estimating a column torque in an MDPS system, which can estimate and provide a column torque based on a vehicle speed, a steering angle and a yaw rate to generate an assist torque required for a driver, even though a torque sensor breaks down in the MDPS system, thereby maximizing the safety and robustness of the MDPS system.

In an embodiment, an apparatus for estimating a column torque in a motor-driven power steering system may include: a vehicle speed sensing unit configured to sense a vehicle speed of a vehicle; a steering sensing unit configured to sense a steering state of a driver; a yaw rate sensor configured to output a measured yaw rate by sensing a tilted state of the vehicle; and a column torque estimation unit configured to calculate a self-aligning torque and an estimated yaw rate based on the vehicle speed and the steering state inputted from the vehicle speed sensing unit and the steering sensing unit, estimate a column torque by adjusting angular velocity compensation gains with respect to a steering angular velocity for each of the estimated yaw rate and the vehicle speed, and output a final column torque by adjusting the estimated column torque according to a difference between the measured yaw rate inputted from the yaw rate sensor and the estimated yaw rate.

The steering sensing unit may sense a steering angle through any one of a steering angle sensor and a motor angle sensor, and may output the steering state by calculating the steering angular velocity based on the steering angle.

The column torque estimation unit may include: a self-aligning torque calculation section configured to calculate the self-aligning torque based on the vehicle speed and the steering angle according to the steering state; a self-aligning torque gain adjustment section for each vehicle speed configured to receive the vehicle speed, and adjust a self-aligning torque gain according to the vehicle speed; an angular velocity gain adjustment section configured to receive the estimated yaw rate, the vehicle speed and the steering angular velocity, and adjust gains for compensating for respective outputs of the steering angular velocity; a column torque calculation section configured to calculate the estimated column torque by compensating for the self-aligning toque through applying the gain, adjusted in the self-aligning torque gain adjustment section for each vehicle speed, to the self-aligning torque calculated in the self-aligning torque calculation section and by applying, to the compensated self-aligning torque, a steering angular velocity compensated for through applying the gains adjusted in the angular velocity gain adjustment section, to the steering angular velocity; and a spin prevention processing section configured to output the final column torque by adjusting the estimated column torque calculated in the column torque calculation section according to a difference between the measured yaw rate and the estimated yaw rate.

The self-aligning torque calculation section may calculate the self-aligning torque by calculating a side slip angle and the estimated yaw rate of the vehicle through receiving the vehicle speed and the steering angle.

The angular velocity gain adjustment section may include: an angular velocity compensation gain adjustment part for each yaw configured to receive the estimated yaw rate from the self-aligning torque calculation section, and adjust the compensation gain for compensating for the steering angular velocity according to the yaw rate; an angular velocity compensation gain adjustment part for each vehicle speed configured to receive the vehicle speed, and adjust the compensation gain for compensating for the steering angular velocity according to the vehicle speed; and an output derating processing part for each angular velocity configured to receive the steering angular velocity, and derate an output according to the steering angular velocity.

In an embodiment, a method for estimating a column torque in a motor-driven power steering system may include: receiving a vehicle speed and a steering angle and calculating a self-aligning torque, by a column torque estimation unit; adjusting the calculated self-aligning torque by adjusting a self-aligning torque gain according to the vehicle speed, by the column torque estimation unit; compensating for an output of a steering angular velocity according to an estimated yaw rate calculated based on the vehicle speed and the steering angle, the vehicle speed and the angular velocity, respectively, by the column torque estimation unit; estimating a column torque by applying a compensated steering angular velocity to an adjusted self-aligning torque, by the column torque estimation unit; and outputting a final column torque by compensating for an estimated column torque according to a difference between a measured yaw rate sensed by a yaw rate sensor and the estimated yaw rate, by column torque estimation unit.

In the calculating of the self-aligning torque, the column torque estimation unit may calculate the self-aligning torque by calculating a side slip angle and the estimated yaw rate of a vehicle through receiving the vehicle speed and the steering angle.

The compensating for of the output of the steering angular velocity may include: receiving the estimated yaw rate and adjusting a compensation gain of the steering angular velocity according to the yaw rate, by the column torque estimation unit; receiving the vehicle speed and adjusting a compensation gain of the steering angular velocity according to the vehicle speed, by the column torque estimation unit; and derating an output according to the steering angular velocity, by the column torque estimation unit.

The apparatus and method for estimating a column torque in an MDPS system according to the embodiments of the disclosure can estimate and provide a column torque based on a vehicle speed, a steering angle and a yaw rate to generate an assist torque required for a driver, even though a torque sensor breaks down in the MDPS system, thereby maximizing the safety and robustness of the MDPS system.

Also, according to the embodiments of the disclosure, by estimating and providing a column torque based on a vehicle speed, a steering angle and a yaw rate, peripheral functions using a column torque in the MDPS system may normally operate to maintain a more natural steering feel.

DETAILED DESCRIPTION OF THE ILLUSTRATED EMBODIMENTS

Hereinafter, an apparatus and method for estimating a column torque in a motor-driven power steering system will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
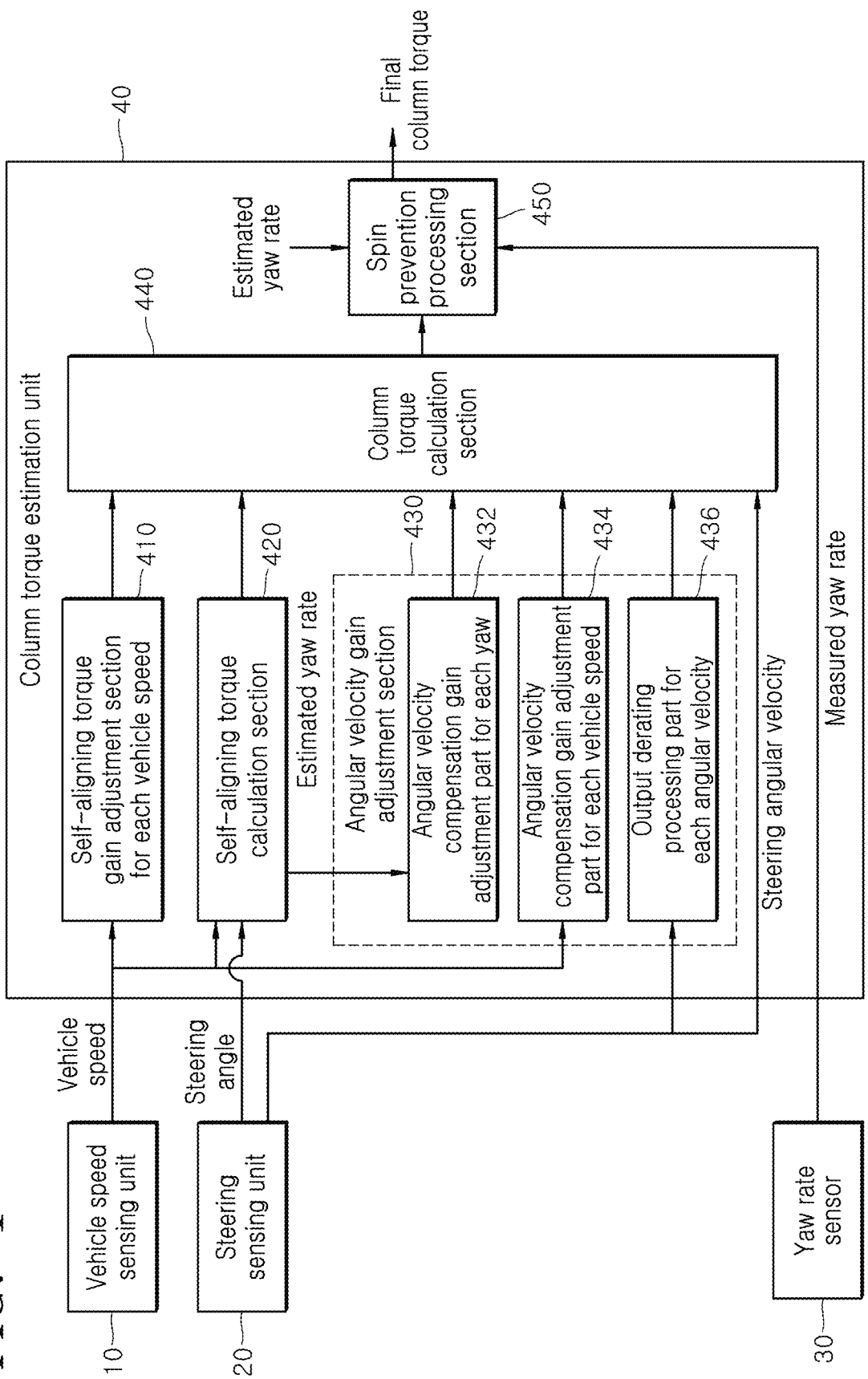
FIG. 1 is a block diagram illustrating a representation of an example of the configuration of an apparatus for estimating a column torque in an MDPS system in accordance with an embodiment of the disclosure.

FIG. 1 is a block diagram illustrating a representation of an example of the configuration of an apparatus for estimating a column torque in an MDPS system in accordance with an embodiment of the disclosure.

As illustrated in FIG. 1, the apparatus for estimating a column torque in an MDPS system in accordance with the embodiment of the disclosure may include a vehicle speed sensing unit 10, a steering sensing unit 20, a yaw rate sensor 30, and a column torque estimation unit 40.

The vehicle speed sensing unit 10 may sense a speed of a vehicle and provide the sensed vehicle speed to the column torque estimation unit 40.

The steering sensing unit 20 may measure a steering state of a driver and provide the measured steering state to the column torque estimation unit 40.

In the present embodiment, the steering sensing unit 20 may be any one of a steering angle sensor (not illustrated) and a motor angle sensor (not illustrated).

The steering angle sensor measures a steering angle through which a steering wheel steered by the driver is rotated, and the motor angle sensor measures a motor angle through which a driving motor (not illustrated) of the MDPS system is rotated according to the steering of the driver.

Therefore, in the present embodiment, the steering sensing unit 20 may output the steering state of the driver by sensing a steering angle through reflecting a gear ratio based on a result measured by the steering angle sensor or the motor angle sensor and by calculating a steering angular velocity based on the steering angle.

The yaw rate sensor 30 may sense a tilted state of the vehicle and provide a measured yaw rate to the column torque estimation unit 40.

The column torque estimation unit 40 may calculate a self-aligning torque and an estimated yaw rate based on the vehicle speed and the steering state inputted from the vehicle speed sensing unit 10 and the steering sensing unit 20, may estimate a column torque by adjusting an angular velocity compensation gain with respect to the steering angular velocity for each of the estimated yaw rate and the vehicle speed, and may output a final column torque by adjusting the estimated column torque according to a difference between the measured yaw rate inputted from the yaw rate sensor 30 and the estimated yaw rate.

The column torque estimation unit 40 may include a self-aligning torque calculation section 420, a self-aligning torque gain adjustment section 410 for each vehicle speed, an angular velocity gain adjustment section 430, a column torque calculation section 440, and a spin prevention processing section 450.

The self-aligning torque calculation section 420 may receive the vehicle speed and the steering angle according to the steering state, and may calculate the self-aligning torque based on a dynamic model of the vehicle.

The self-aligning torque calculation section 420 may calculate the self-aligning torque by calculating a side slip angle and the estimated yaw rate of the vehicle through receiving the vehicle speed and the steering angle.

That is to say, based on the dynamic model of the vehicle, the side slip angle and the estimated yaw rate may be derived through a vehicle weight, the vehicle speed, a side slip angle, cornering stiffness of front and rear wheels, distances to the front and rear wheels from the center of the vehicle and the steering angle, and, based on the side slip angle and the estimated yaw rate, the self-aligning torque of the vehicle may be calculated on the assumption that side slip angles and cornering forces of left and right tires are the same.

The self-aligning torque gain adjustment section 410 for each vehicle speed may receive the vehicle speed, and may adjust a self-aligning torque gain according to the vehicle speed.

The self-aligning torque calculated by the self-aligning torque calculation section 420 is similar in terms of pattern and magnitude to a rack force required when the driver actually steers in a general road situation. In other words, a total rack force required when the driver steers may be derived.

However, since the self-aligning torque has a magnitude similar to the total rack force required when the driver steers, in consideration of this fact, the driver's steering force should be considered in the total rack force actually required in the vehicle, to maintain a natural steering feel when the driver actually steers.

Therefore, the self-aligning torque may be adjusted for each vehicle speed through the self-aligning torque gain adjustment section 410 for each vehicle speed such that a gain is adjusted to be light at a low speed and be heavy at a high speed so that the self-aligning torque becomes similar to a normal steering feel.

The angular velocity gain adjustment section 430 may receive the estimated yaw rate, the vehicle speed and the steering angular velocity, and may adjust gains for compensating for the respective outputs of the steering angular velocity.

In the case where the steering angular velocity is applied to generate the estimated column torque, a quick responsive output may be obtained when the driver steers.

In the case where the self-aligning torque is calculating based on the vehicle speed and the steering angle as described above, there may be a case where some delay occurs in following the phase of an actual column torque. Therefore, through multiplying the steering angular velocity by each of the gains for compensating for the output and then applying the product of the steering angular velocity and each gain to the estimated column torque, initial steering responsiveness may be greatly increased.

Thus, the angular velocity gain adjustment section 430 may adjust the gains of the angular velocity by including an angular velocity compensation gain adjustment part 432 for each yaw, an angular velocity compensation gain adjustment part 434 for each vehicle speed, and an output derating processing part 436 for each angular velocity.

The angular velocity compensation gain adjustment part 432 for each yaw may receive the estimated yaw rate from the self-aligning torque calculation section 420, and may adjust the compensation gain for compensating for the steering angular velocity according to the yaw rate.

The angular velocity compensation gain adjustment part 434 for each vehicle speed may receive the vehicle speed, and may adjust the compensation gain for compensating for the steering angular velocity according to the vehicle speed.

The output derating processing part 436 for each angular velocity may receive the steering angular velocity, and may derate an output according to the steering angular velocity.

In the case where a steering speed is fast, because the driving motor actually enters a field-weakening region and thus cannot generate a sufficient torque, the driver may feel heavy steering. Therefore, through the angular velocity compensation gain adjustment part 434 for each vehicle speed, the compensation gain may be adjusted to reduce the steering angular velocity as the vehicle speed becomes higher.

If the unit of the steering angular velocity is set to RPS, a speed at which the driver may steer is 0 to 4 RPS. In the case where the compensation gain is set to 2.5 at maximum, when a maximum column torque measured through a column torque sensor (not illustrated) is 10 Nm, an output scale may be adjusted in correspondence thereto.

Therefore, through the angular velocity gain adjustment section 430, a steering feel may be adjusted through a table according to the vehicle speed and the steering angular velocity.

The column torque calculation section 440 may calculate the estimated column torque by compensating for the self-aligning toque through applying the gain, adjusted in the self-aligning torque gain adjustment section 410 for each vehicle speed, to the self-aligning torque calculated in the self-aligning torque calculation section 420 and by applying, to the compensated self-aligning torque, a steering angular velocity, compensated for through applying the gains adjusted in the angular velocity gain adjustment section 430, to the steering angular velocity.

The spin prevention processing section 450 may output the final column torque by adjusting the estimated column torque calculated in the column torque calculation section 440 according to the difference between the measured yaw rate and the estimated yaw rate.

In the case where a large yaw occurs due to a spin that occurs in the vehicle, an unexpected large compensation output may be outputted because the vehicle operates differently from the vehicle's geometry and dynamic characteristics according to the vehicle speed and the steering angle. Namely, in the case where a column torque is estimated based on the measured yaw rate measured through the yaw rate sensor 30, if a spin occurs as described above, a large compensation output may be outputted to cause a problem such as unintentional self-steering, thereby degrading the driver's safety and increasing a sense of heterogeneity felt by the driver during steering.

In the present embodiment, when calculating a self-aligning torque, the self-aligning torque is not calculated based on the measured yaw rate measured through the yaw rate sensor 30 but calculated by applying the estimated yaw rate calculated based on the vehicle speed and the steering angle. Therefore, in the case where the vehicle is in a state different from the driver's intention, a compensation output may not be generated.

Therefore, by comparing the measured yaw rate and the estimated yaw rate, in the case where a difference equal to or larger than a preset value occurs therebetween, the spin prevention processing section 450 may perform compensation by reducing the estimated column torque according to a difference value.

As such, by estimating and providing a column torque in the case where a torque sensor breaks down, the estimated column torque may be applied to a stabilization filter capable of avoiding a resonance point of the MDPS system, a booster curve capable of adjusting a steering feel, a high-frequency controller for increasing the responsiveness, and other logics of the MDPS system such as a self-aligning logic and a damping logic, thereby reducing vibration by external disturbances to maintain a more natural steering feel.

As is apparent from the above descriptions, the apparatus for estimating a column torque in an MDPS system according to the embodiment of the disclosure can estimate and provide a column torque based on a vehicle speed, a steering angle and a yaw rate to generate an assist torque required for a driver, even though a torque sensor breaks down in the MDPS system, thereby maximizing the safety and robustness of the MDPS system. Also, peripheral functions using a column torque in the MDPS system may normally operate to maintain a more natural steering feel.

Figure 2:
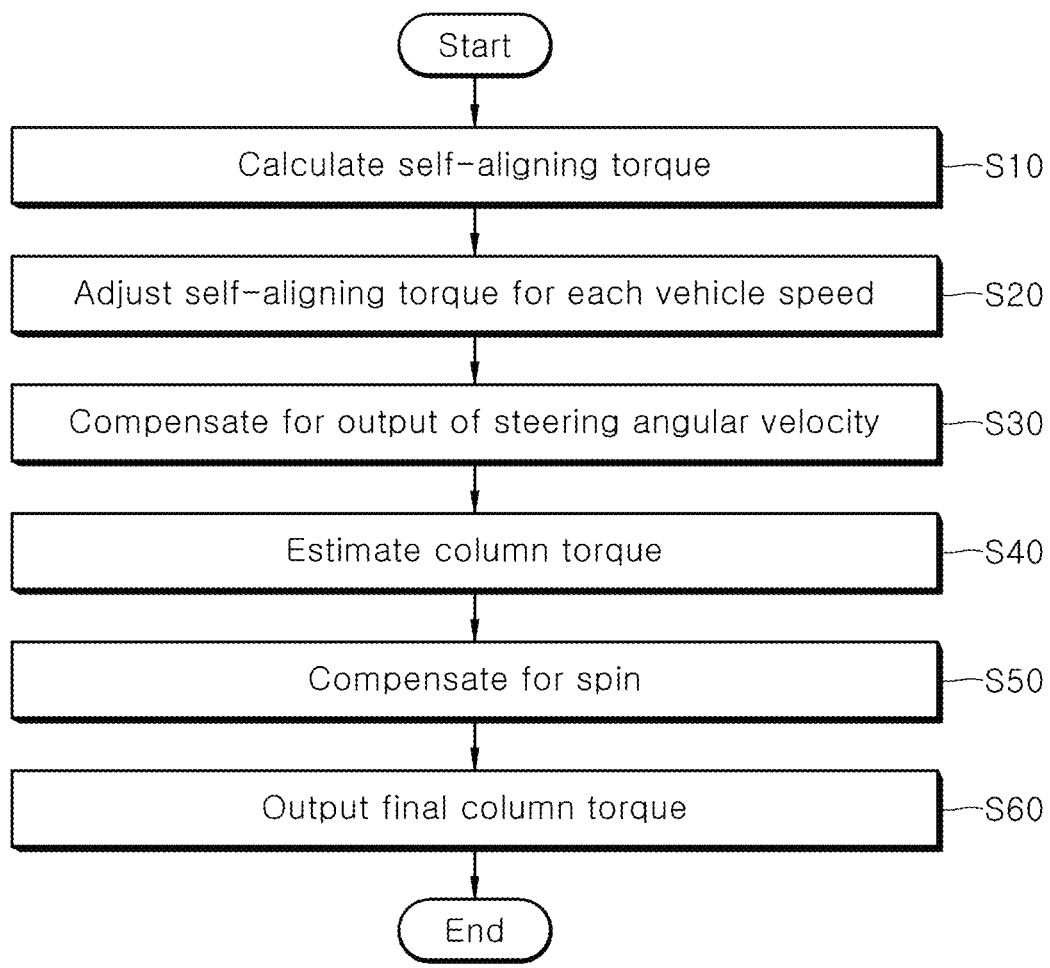
FIG. 2 is a representation of an example of a flow chart to assist in the explanation of a method for estimating a column torque in an MDPS system in accordance with an embodiment of the disclosure.

FIG. 2 is a representation of an example of a flow chart to assist in the explanation of a method for estimating a column torque in an MDPS system in accordance with an embodiment of the disclosure.

As illustrated in FIG. 2, in the method for estimating a column torque in an MDPS system in accordance with the embodiment of the disclosure, first, the column torque estimation unit 40 receives a vehicle speed and a steering angle, and calculates a self-aligning torque based on a dynamic model of a vehicle (S10).

At the step S10, the column torque estimation unit 40 may calculate the self-aligning torque by calculating a side slip angle and an estimated yaw rate of the vehicle through receiving the vehicle speed and the steering angle.

That is to say, based on the dynamic model of the vehicle, the side slip angle and the estimated yaw rate may be derived through a vehicle weight, the vehicle speed, a side slip angle, cornering stiffness of front and rear wheels, distances to the front and rear wheels from the center of the vehicle and the steering angle, and, based on the side slip angle and the estimated yaw rate, the self-aligning torque of the vehicle may be calculated on the assumption that side slip angles and cornering forces of left and right tires are the same.

After calculating the self-aligning torque at the step S10, the column torque estimation unit 40 adjusts the calculated self-aligning torque by adjusting a self-aligning torque gain according to the vehicle speed (S20).

The self-aligning torque calculated at the step S10 is similar in terms of pattern and magnitude to a rack force required when the driver actually steers in a general road situation. In other words, a total rack force required when the driver steers may be derived.

However, since the self-aligning torque has a magnitude similar to the total rack force required when the driver steers, in consideration of this fact, the driver's steering force should be considered in the total rack force actually required in the vehicle, to maintain a natural steering feel when the driver actually steers.

Therefore, at the step S20, the self-aligning torque may be adjusted for each vehicle speed such that a gain is adjusted to be light at a low speed and be heavy at a high speed so as to compensate for the self-aligning torque so that the self-aligning torque becomes similar to a normal steering feel.

The column torque estimation unit 40 compensates for the output of a steering angular velocity according to the estimated yaw rate calculated based on the vehicle speed and the steering angle, the vehicle speed and the angular velocity, respectively (S30).

In the case where the self-aligning torque is calculating based on the vehicle speed and the steering angle as described above, there may be a case where some delay occurs in following the phase of an actual column torque. Therefore, through multiplying the steering angular velocity by each of the gains for compensating for the output and then applying the product of the steering angular velocity and each gain to the estimated column torque, initial steering responsiveness may be greatly increased.

Therefore, at the step S30, the column torque estimation unit 40 may adjust the compensation gain of the steering angular velocity according to the estimated yaw rate, may adjust the compensation gain of the steering angular velocity according to the vehicle speed, and may derate the output according to the steering angular velocity.

After compensating for the output of the steering angular velocity at the step S30, the column torque estimation unit 40 estimates a column torque by applying the compensated steering angular velocity to the self-aligning torque compensated for for each vehicle speed (S40).

After estimating the column torque at the step S40, the column torque estimation unit 40 outputs a final column torque by compensating for the estimated column torque according to the difference between the measured yaw rate sensed by the yaw rate sensor 30 and the estimated yaw rate (S50).

In the case where a large yaw occurs due to a spin that occurs in the vehicle, an unexpected large compensation output may be outputted because the vehicle operates differently from the vehicle's geometry and dynamic characteristics according to the vehicle speed and the steering angle. Namely, in the case where a column torque is estimated based on the measured yaw rate measured through the yaw rate sensor 30, if a spin occurs as described above, a large compensation output may be outputted to cause a problem such as unintentional self-steering, thereby degrading the driver's safety and increasing a sense of heterogeneity felt by the driver during steering.

Therefore, in the present embodiment, when calculating a self-aligning torque, the self-aligning torque is not calculated based on the measured yaw rate measured through the yaw rate sensor 30 but calculated by applying the estimated yaw rate calculated based on the vehicle speed and the steering angle. Therefore, in the case where the vehicle is in a state different from the driver's intention, a compensation output may not be generated. By comparing the measured yaw rate and the estimated yaw rate, in the case where a difference equal to or larger than a preset value occurs therebetween, compensation may be performed by reducing the estimated column torque according to a difference value.

As is apparent from the above descriptions, the method for estimating a column torque in an MDPS system according to the embodiment of the disclosure can estimate and provide a column torque based on a vehicle speed, a steering angle and a yaw rate to generate an assist torque required for a driver, even though a torque sensor breaks down in the MDPS system, thereby maximizing the safety and robustness of the MDPS system. Also, peripheral functions using a column torque in the MDPS system may normally operate to maintain a more natural steering feel.

The embodiments described in this specification may be implemented with a method or process, a device, a software program, a data stream or a signal, for example. Although the embodiments have been discussed in the context of a single implementation (for example, only in a method), the discussed features can be implemented in other forms (for example, device or program). The device can be implemented in proper hardware, software, firmware and the like. The method can be implemented in a device such as a processor which generally refers to a processing device including a computer, a microprocessor, an integrated circuit or a programmable logic device. The processor includes a communication device such as a computer, a cell phone, a personal digital assistant (PDA) and another device, which can facilitate communication of information between an end user and the processor.

Although preferred embodiments of the disclosure have been disclosed for illustrative purposes, those skilled in the art will appreciate that various modifications, additions and substitutions are possible, without departing from the scope and spirit of the disclosure as defined in the accompanying claims.

Thus, the true technical scope of the disclosure should be defined by the following claims.

What is claimed is:

1. An apparatus for estimating a column torque in a motor-driven power steering system, comprising:
   a vehicle speed sensing unit configured to sense a vehicle speed of a vehicle;
   a steering sensing unit configured to sense a steering state of a driver;
   a yaw rate sensor configured to output a measured yaw rate by sensing a tilted state of the vehicle; and
   a column torque estimation unit configured to calculate a self-aligning torque and an estimated yaw rate based on the vehicle speed and the steering state inputted from the vehicle speed sensing unit and the steering sensing unit, estimate a column torque by adjusting angular velocity compensation gains with respect to a steering angular velocity for each of the estimated yaw rate and the vehicle speed, and output a final column torque by adjusting the estimated column torque according to a difference between the measured yaw rate inputted from the yaw rate sensor and the estimated yaw rate.

2. The apparatus according to claim 1, wherein the steering sensing unit senses a steering angle through any one of a steering angle sensor and a motor angle sensor, and outputs the steering state by calculating the steering angular velocity based on the steering angle.

3. The apparatus according to claim 1, wherein the column torque estimation unit comprises:
   a self-aligning torque calculation section configured to calculate the self-aligning torque based on the vehicle speed and the steering angle according to the steering state;
   a self-aligning torque gain adjustment section for each vehicle speed configured to receive the vehicle speed, and adjust a self-aligning torque gain according to the vehicle speed;
   an angular velocity gain adjustment section configured to receive the estimated yaw rate, the vehicle speed and the steering angular velocity, and adjust gains for compensating for respective outputs of the steering angular velocity;
   a column torque calculation section configured to calculate the estimated column torque by compensating for the self-aligning toque through applying the gain, adjusted in the self-aligning torque gain adjustment section for each vehicle speed, to the self-aligning torque calculated in the self-aligning torque calculation section and by applying, to the compensated self-aligning torque, a steering angular velocity compensated for through applying the gains adjusted in the angular velocity gain adjustment section, to the steering angular velocity; and
   a spin prevention processing section configured to output the final column torque by adjusting the estimated column torque calculated in the column torque calculation section according to a difference between the measured yaw rate and the estimated yaw rate.

4. The apparatus according to claim 3, wherein the self-aligning torque calculation section calculates the self-aligning torque by calculating a side slip angle and the estimated yaw rate of the vehicle through receiving the vehicle speed and the steering angle.

5. The apparatus according to claim 3, wherein the angular velocity gain adjustment section comprises:
   an angular velocity compensation gain adjustment part for each yaw configured to receive the estimated yaw rate from the self-aligning torque calculation section, and adjust the compensation gain for compensating for the steering angular velocity according to the yaw rate;
   an angular velocity compensation gain adjustment part for each vehicle speed configured to receive the vehicle speed, and adjust the compensation gain for compensating for the steering angular velocity according to the vehicle speed; and
   an output derating processing part for each angular velocity configured to receive the steering angular velocity, and derate an output according to the steering angular velocity.

6. A method for estimating a column torque in a motor-driven power steering system, comprising:
   receiving a vehicle speed and a steering angle and calculating a self-aligning torque, by a column torque estimation unit;
   adjusting the calculated self-aligning torque by adjusting a self-aligning torque gain according to the vehicle speed, by the column torque estimation unit;
   compensating for an output of a steering angular velocity according to an estimated yaw rate calculated based on the vehicle speed and the steering angle, the vehicle speed and the angular velocity, respectively, by the column torque estimation unit;
   estimating a column torque by applying a compensated steering angular velocity to an adjusted self-aligning torque, by the column torque estimation unit; and
   outputting a final column torque by compensating for an estimated column torque according to a difference between a measured yaw rate sensed by a yaw rate sensor and the estimated yaw rate, by column torque estimation unit.

7. The method according to claim 6, wherein, in the calculating of the self-aligning torque, the column torque estimation unit calculates the self-aligning torque by calculating a side slip angle and the estimated yaw rate of a vehicle through receiving the vehicle speed and the steering angle.

8. The method according to claim 6, wherein the compensating for of the output of the steering angular velocity comprises:
   receiving the estimated yaw rate and adjusting a compensation gain of the steering angular velocity according to the yaw rate, by the column torque estimation unit;
   receiving the vehicle speed and adjusting a compensation gain of the steering angular velocity according to the vehicle speed, by the column torque estimation unit; and
   derating an output according to the steering angular velocity, by the column torque estimation unit.

* * * * *